United States Patent
Assmann et al.

(10) Patent No.: US 8,111,888 B2
(45) Date of Patent: Feb. 7, 2012

(54) METHOD FOR AUTOMATICALLY SELECTING A DISPLAY MODE FOR AN IMAGE DATA RECORD OF AN ORGAN TO BE EXAMINED

(75) Inventors: Stefan Assmann, Erlangen (DE); Okan Ekinci, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 932 days.

(21) Appl. No.: 12/153,485

(22) Filed: May 20, 2008

(65) Prior Publication Data
US 2008/0292172 A1 Nov. 27, 2008

(30) Foreign Application Priority Data
May 24, 2007 (DE) .......................... 10 2007 024 154

(51) Int. Cl.
*G06K 9/00* (2006.01)
(52) U.S. Cl. ........................................................ 382/128
(58) Field of Classification Search .................... 382/128
See application file for complete search history.

(56) References Cited

U.S. PATENT DOCUMENTS

| | | | |
|---|---|---|---|
| 6,501,848 B1 * | 12/2002 | Carroll et al. ............ | 382/128 |
| 6,829,379 B1 | 12/2004 | Knoplioch et al. | |
| 7,636,463 B2 * | 12/2009 | Deshpande et al. ........ | 382/128 |
| 7,940,977 B2 * | 5/2011 | Begelman et al. .......... | 382/133 |
| 7,957,572 B2 * | 6/2011 | Von Berg et al. .......... | 382/128 |
| 2003/0078671 A1 * | 4/2003 | Lesniak et al. ............ | 623/23.64 |
| 2006/0159326 A1 * | 7/2006 | Rasche et al. ............. | 382/131 |
| 2008/0075750 A1 * | 3/2008 | Akins, Jr. .................. | 424/423 |
| 2008/0091171 A1 * | 4/2008 | Strommer et al. .......... | 604/528 |
| 2010/0278405 A1 * | 11/2010 | Kakadiaris et al. ........ | 382/131 |

FOREIGN PATENT DOCUMENTS

DE 103 12 193 9/2004

OTHER PUBLICATIONS

Manuel D. Cerqueira et al.: "Standardized Myocardial Segmentation and Nomenclature for Tomographic Imaging of the Heart", Circulation Journal of the American Heart Association, Dallas, TX, pp. 539-542, Mar. 2002.0thers 2002.
German Office Action issued Jan. 31, 2008.

* cited by examiner

*Primary Examiner* — Rodney Fuller
(74) *Attorney, Agent, or Firm* — Harness, Dickey & Pierce, P.L.C.

(57) ABSTRACT

At least one example embodiment discloses a method for automatically selecting a display mode for an image data record is provided. In the at least one example embodiment, spatially resolved values of a parameter are determined in a first image data record of the organ to be examined, with the parameter allowing an evaluation of a functionality of the organ to be examined. Thereupon a deviation of the determined values of the parameter from a tolerance range is localized. The result of the localization is saved, and a display mode of a second image data record is selected on the basis of the result of localization, with the second image data record being a 3D image data record. The second image data record is shown in the selected display mode.

17 Claims, 3 Drawing Sheets

METHOD FOR AUTOMATICALLY SELECTING A DISPLAY MODE FOR AN IMAGE DATA RECORD OF AN ORGAN TO BE EXAMINED

PRIORITY STATEMENT

The present application hereby claims priority under 35 U.S.C. §119 on German patent application number DE 10 2007 024 154.4 filed May 24, 2007, the entire contents of which is hereby incorporated herein by reference.

FIELD

Embodiments of the invention generally relate to a method for automatically selecting a display mode for an image data record of an organ to be examined.

BACKGROUND

Modern medical examination and imaging methods, such as computed tomography (CT) or magnetic resonance imaging (MRI), generate image data records which allow the localization of pathologically changed regions in an examination object. The cause of the pathological change cannot always also be displayed in the same image data record.

By way of example, in the case of examinations of the heart, functional anomalies, such as an infarct, are detected on the myocardium. However, the cause of the anomaly often lies in a defect in the supply of the myocardium with blood, for example, and can thus be found in the respective coronary artery, for instance in the form of a stenosis.

By way of example, if findings of the coronary arteries are therefore to be prepared, an attempt must be made to find a view by rotating a generally three-dimensional, corresponding coronary artery image data record in which the correct section of the coronary arteries can be seen in an unobstructed manner. This manual rotation is time-consuming and requires a high degree of anatomical knowledge and qualifications. The object of the present invention is thus to provide a method which simplifies and accelerates the procedure for findings, for example.

SUMMARY

In at least one embodiment of the invention, a method is disclosed for automatically selecting a display mode for an image data record of an organ to be examined is provided. In the process, a first image data record of the organ to be examined is displayed. Spatially resolved values of a parameter are determined in the first image data record, with the parameter allowing an evaluation of a functionality of the organ to be examined. Thereupon, a deviation of the determined values of the parameter from a tolerance range is localized. The result of the localization is saved, and a display mode of a second image data record is selected on the basis of the result of localization, with the second image data record being a 3D image data record. The second image data record is displayed in the selected display mode.

The consequently automated selection of a display mode for a second image data record on the basis of findings in a first image data record ensures a display of the second image data record in a manner correlated with the findings in the first image data record and accelerates and simplifies the procedure for comprehensive findings.

Advantageously, the organ to be examined is subdivided into segments in order to facilitate localizing a deviation of the parameter. In this case the segments are denoted in such a manner that reference to an anatomical position and/or direction is established.

In order to save the result of the localization, the result of the localization is marked in a simple manner in a schematic representation of the organ to be examined. The position of the localized deviation can thus also be reconstructed quickly and intuitively at a later point in time.

BRIEF DESCRIPTION OF THE DRAWINGS

Further advantages and details of the present invention emerge from the example embodiments described below, which do not limit the invention in any way, and from the drawings, in which.

DETAILED DESCRIPTION OF THE EXAMPLE EMBODIMENTS

Figure 1:
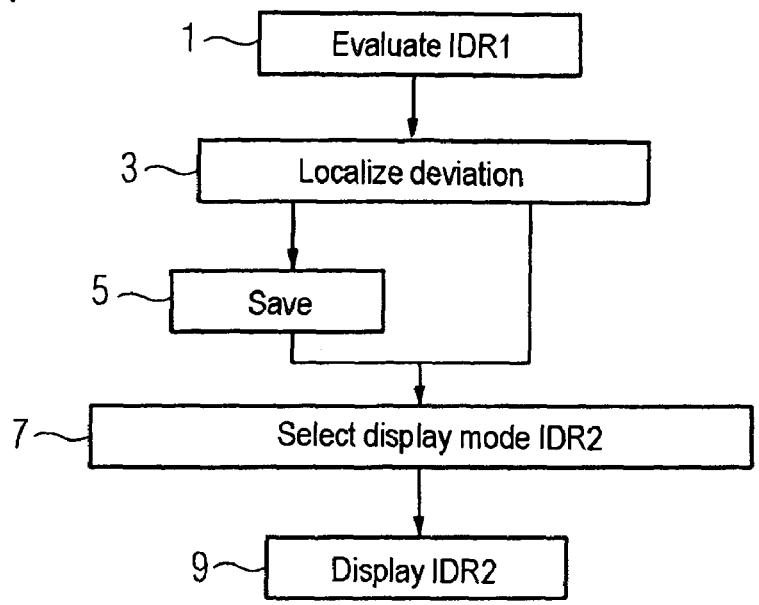
FIG. 1 shows a flow chart of the method for automatically selecting a display mode for an image data record of an organ to be examined.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a flow chart of an embodiment of the inventive method. In a first step 1, a first image data record (IDR1) of an organ to be examined, for example the heart, is displayed and evaluated site-specifically. For this purpose, the values of a parameter in the first image data record are determined.

Different parameters can be evaluated, depending on the type of the first image data record. By way of example, if the first image data record is an image data record recorded by a contrast agent enhanced picture by way of a magnetic resonance scanner, then the parameter can be the temporal profile of an enhancement or a washout of the contrast agent used. If the first image data record represents the perfusion of the heart (a further possible examination by way of MRI), then the perfusion values are evaluated.

Further possible parameters are the contractility of the heart or the left ventricle, the thickness of a part of the organ, for example the wall thickness of a ventricle, or the motility (ability to move) of the organ to be examined. First image data records which allow an evaluation of said parameters are, for instance, ventricle function data records, morphological images or cine displays of the organ to be examined. A first image data record can thus be both two-dimensional (2D) and three-dimensional (3D), or else comprise a series of 2D image data records. Possible examination modalities include magnetic resonance scanners or computed tomographs, for example.

In a second step 3, a location or locations, in which the evaluated parameter lies outside a tolerance range, are localized in the first image data record. This means that for example an observer conducting the findings determines, depending on the type of parameter evaluated, where the contrast agent, for example, is more extensively enhanced or where the thickness of a muscle, for example, is unusually small.

Often, a first approximate localization is already provided by the first image data record itself because the location of an examination object or patient which was imaged in the first image data record is usually known from the recording plan.

The precise localization is facilitated if the organ to be examined was subdivided into segments. In this case it can suffice to specify that segment in which the deviation lies for the purpose of localization. A possible way of subdividing a left ventricle into segments is specified in FIGS. 2 to 5 and in the associated description. Of course, different, for example coarser or finer, subdivisions into segments are also conceivable, depending on the organ and requirements.

Figure 6:
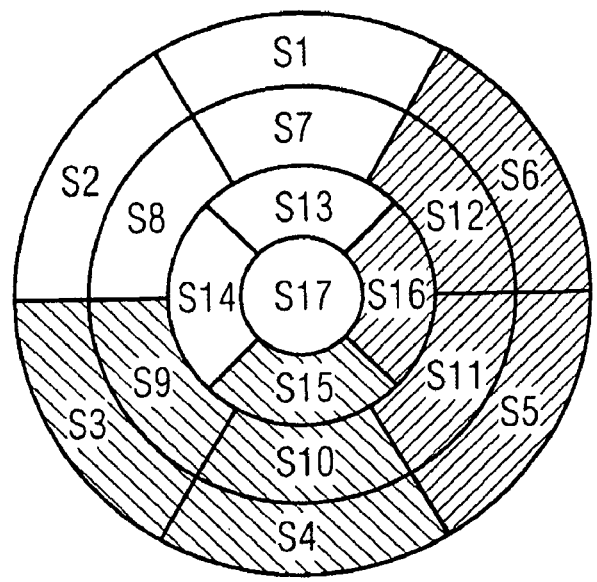
FIG. 6 shows a schematic illustration of an organ to be examined by way of example of a so-called "bull's eye" representation of the left ventricle according to the same subdivision as in FIGS. 2 to 5.

The result of the localization of the deviation of the parameter is saved (step 5). Preferably, for this purpose, the result of the localization is marked on a schematic illustration of the organ to be examined. This is useful in particular in the case of a later review of the case, in order to be able to quickly recreate an association of the deviation to a location on the organ to be examined. An example of such a schematic illustration is shown in FIG. 6.

Once the deviation of the parameter from a tolerance range is localized, a display mode for a second image data record is selected in a further step 7 on the basis of the result of the localization.

The selection of the display mode for the second image data record can be carried out directly after the localization or at a later point in time with the aid of the saved result of the localization.

The display mode of the second image data record relates, for example, to a viewing angle of the second image data record. By way of example, if an infarct was localized on a heart in the first image data record on the basis of the parameter, and if the coronary artery responsible for supplying the region of the infarct is to now be examined in the second image data record, for instance in a three-dimensional coronary artery data record, then specifying the result of the localization suffices to display the coronary artery data record from a viewing angle which shows the coronary artery correlated with the region of the infarct.

For this purpose, each segment is assigned to a display mode in a simple embodiment of the invention. This is made possible, inter alia, by the fact that, in large parts, the human anatomy is virtually the same for all humans.

As a result of this, if, for example, findings were taken at a first location of an anatomy and a correlation with a second location of the anatomy is surmised, it is possible to determine with great certainty in a generally valid manner how the second location must be displayed in order to be able to verify the correlation.

In particular myocardial regions can be assigned to coronary regions with great certainty. An example of such an assignment is provided further below in the description of FIG. 6.

Since the coronary arteries in humans are also substantially located in a similar position, an optimum viewing angle can for example be fixed for each coronary artery or sections of the coronary arteries.

The viewing angles are usually specified as a combination of a first angle in the transversal plane and a second angle in the sagittal plane. In the process, the first angle is specified by LAO (away to the left from the sagittal plane) or RAO (away to the right from the sagittal plane), followed by an angle specification in degrees. The second angle is specified by Cranial (upward, toward the head, away from the transversal plane) or Caudal (downward, away from the transversal plane), followed by an angle specification in degrees.

By way of example, a viewing angle (RAO 0, Cranial 35) for a coronary artery data record is suitable for displaying the middle and apical regions of the left anterior descending coronary artery with only minimal foreshortening and overlapping.

In a final step 9, the second image data record is shown in the selected display mode.

In a further refinement, a plurality of display modes, which are displayed in an order to be determined, can also be assigned to one segment.

The inventive method of at least one embodiment is installed, for example, on an image processing unit (not illustrated). The image processing unit is designed such that the first and second image data records can be loaded and/or saved. The image processing unit comprises at least one display unit, e.g. a monitor, for displaying the image data records, and an operating unit, e.g. including a mouse and/or a keyboard, by means of which inputs for editing the image data records can be output by a user to the image processing unit.

FIGS. 2 to 5 illustrate an exemplary subdivision of a schematically illustrated left ventricle (LV) into segments according to a recommendation of the American Heart Association (AHA).

According to a recommendation of the AHA, published in "Circulation—Journal of the American Heart Association" (2002), vol. 105, pp. 539-542, the left ventricle (LV) is subdivided into 17 segments S1 to S17. For this purpose, the left ventricle is firstly divided by horizontal (short axis) cuts into four main regions: a basal region B, a mid-cavity region M, an apical region A and the apical cap (apex), which forms the segment S17.

Figure 2:
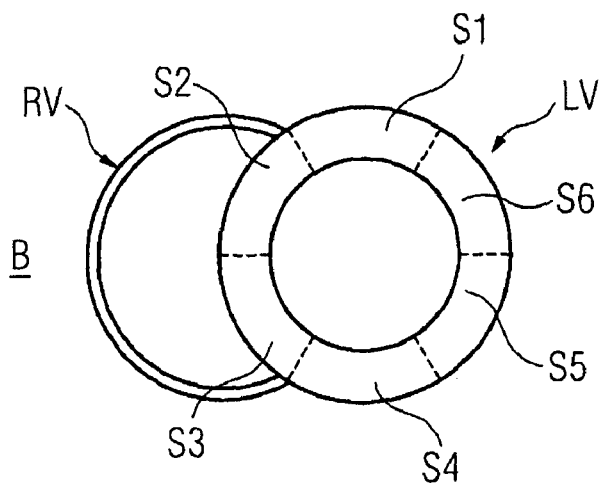
FIGS. 2-5 show an exemplary subdivision of a schematically illustrated left ventricle (LV) into segments according to a recommendation of the American Heart Association (AHA)

FIG. 2 illustrates a short axis cut in the basal region B. This region B is subdivided into six segments, S1 to S6, with segments S2 and S3 identifying the ventricular septum between the left ventricle (LV) and the right ventricle (RV). The segments are, incidentally, distributed as evenly as possible.

Figure 3:
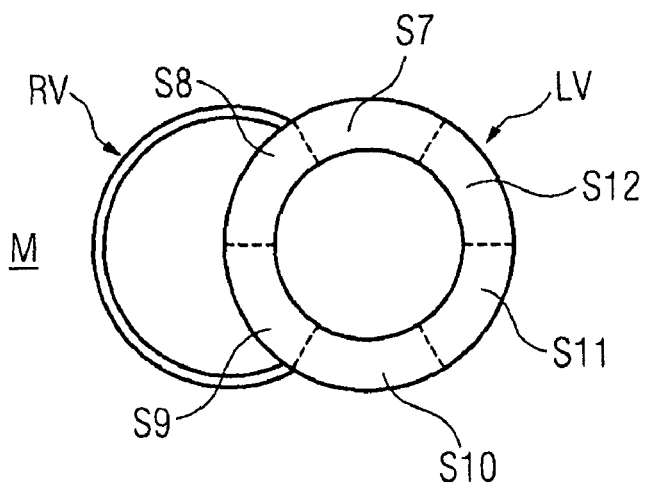

FIG. 3 illustrates a short axis cut in the mid-cavity region M. This region M is also subdivided into six segments—segments S7 to S12. The segments S7 to S12 are distributed analogously to the segments S1 to S6 in the basal region B. Segments S8 and S9 identify the ventricular septum between the left ventricle (LV) and the right ventricle (RV).

Figure 4:
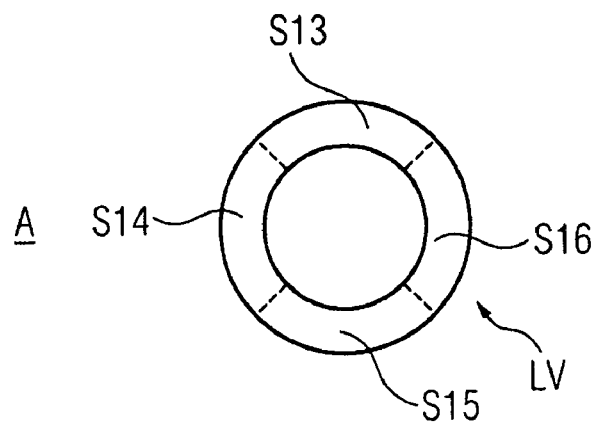

The short axis cut through the left ventricle (LV) in the apical region A, illustrated in FIG. 4, is only subdivided into four segments S13 to S16 due to its smaller diameter, the segments again being distributed as evenly as possible, and being directed "backward", "toward the septum", "forward" and "to the side".

Figure 5:
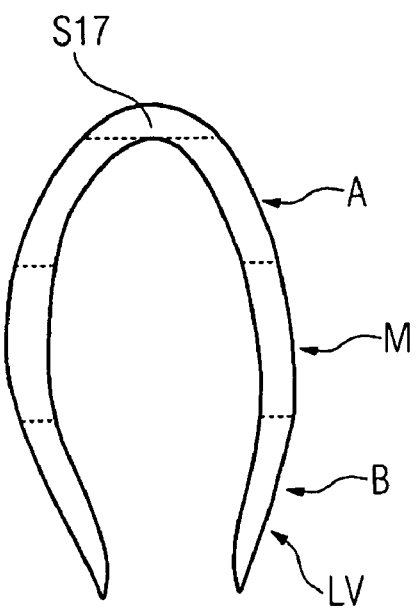

FIG. 5 illustrates a vertical long axis cut (2C-cut) of the left ventricle (LV). The subdivision into basal region B, mid-cavity region M, apical region A and segment S17 is undertaken with aid of the anatomy of the myocardium. According to this, the mid-cavity region M is to be located level with the papillary muscles of the left ventricle at the end of the diastole. Segment S17 forms the apical cap. The remaining regions A and B result from this.

Segments S1 to S17 are referred to according to their anatomical location and orientation as the following:

| | |
|---|---|
| S1: basal anterior | S2: basal anteroseptal |
| S3: basal inferoseptal | S4: basal inferior |
| S5: basal inferolateral | S6: basal anterolateral |
| S7: mid anterior | S8: mid anteroseptal |
| S9: mid inferoseptal | S10: mid inferior |
| S11: mid inferolateral | S12: mid anterolateral |
| S13: apical anterior | S14: apical septal |
| S15: apical inferior | S16: apical lateral |
| S17: apex | |

FIG. 6 shows a schematic illustration of an organ to be examined by way of example of a so-called "bull's eye" representation of the left ventricle. In this representation, the segments S1 to S17 are arranged in rings about the segment S17.

Segments S6, S5, S11, S12, S16 shaded from the bottom left to the top right are assigned to the left circumflex coronary artery (LCX). The segments S3, S4, S9, S10 and S15 hatched from top left to bottom right are associated with the right coronary artery (RCA), and the unhatched segments S1, S2, S7, S8, S13, S14 and S17 are assigned to the left anterior descending coronary artery (LAD).

Figure 7:
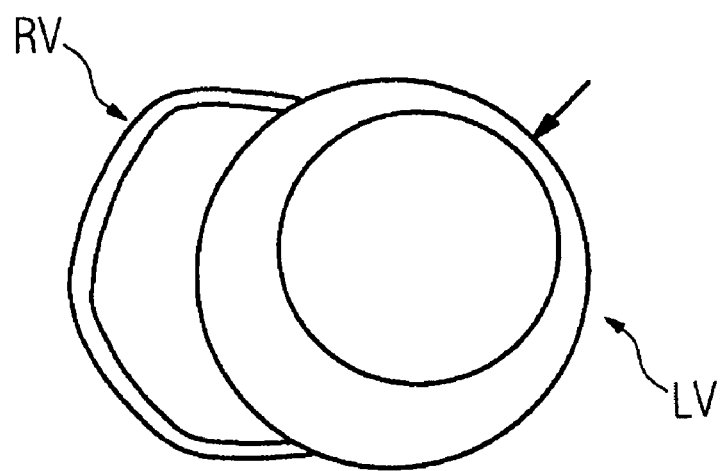
FIG. 7 shows a schematic illustration of a first image data record.

FIG. 7 shows a schematic illustration of a first image data record in the form of a schematic, morphological image of a short axis cut of the heart.

The right ventricle (RV) and the left ventricle (LV) can be seen. A region of the left ventricle (LV), in which the thickness of the chamber wall is decreased, is indicated by an arrow.

Knowledge of the recording plan or further morphological features (not illustrated) allows an observer engaged with the findings to assign the indicated region (arrow) to a segment, for instance segment S6 in the example shown.

Figure 8:
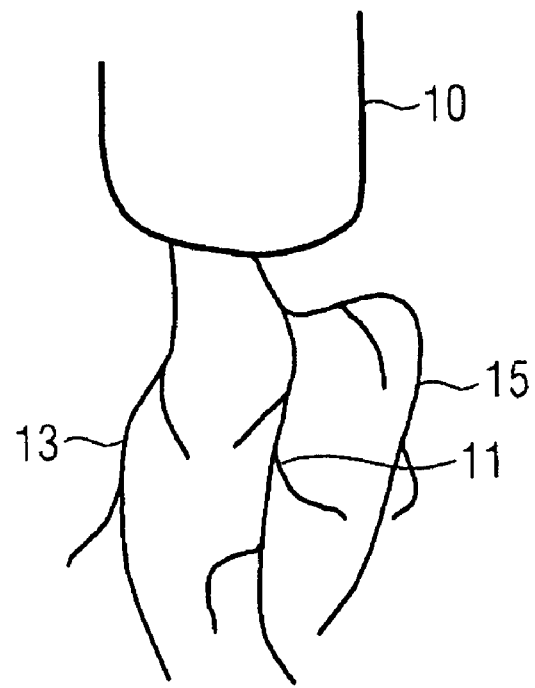
FIG. 8 shows a schematic illustration of a second image data record in a selected display mode.

FIG. 8 schematically illustrates a second image data record using the example of a schematic coronary artery data record. The Aorta 10 and the three main branches of the coronary arteries can be seen: the left anterior descending artery (LAD) 11, the right coronary artery (RCA) 13 and the left circumflex coronary artery (LCX) 15. Furthermore, a few offshoots are depicted.

The coronary artery data record is shown here at a viewing angle which permits an unhindered view of the top main branch of the left coronary artery and the branches LAD and LCX. In this case, the viewing angle assigned to segment S6 would thus be (LAO 60°, Caudal 15°), for example.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for automatically selecting a display mode for an image data record of an organ to be examined, comprising:
   displaying a first image data record of the organ to be examined;
   site-specific determining values of a parameter in the first image data record of the organ to be examined, the parameter allowing an evaluation of a functionality of the organ to be examined;
   localizing a deviation of the determined values of the parameter from a tolerance range;
   saving a result of the localization;
   selecting a display mode of a second image data record based on the result of the localization of the deviation, the second image data record being a 3D image data record; and
   displaying the second image data record in the selected display mode.

2. The method as claimed in claim 1, wherein the localization of the deviation takes place aided by a subdivision of the organ to be examined into segments.

3. The method as claimed in claim 2, wherein a display mode is assigned to each segment.

4. The method as claimed in claim 1, wherein the display mode prescribes the viewing angle.

5. The method as claimed in claim 1, wherein the result of the localization is marked in a schematic representation of the organ to be examined when the result of the localization is being saved.

6. The method as claimed in claim 1, wherein the first image data record is a 2D image data record or a 3D image data record or a series of 2D or 3D image data records.

7. The method as claimed in claim 1, wherein the heart is the organ to be examined.

8. The method as claimed in claim 1, wherein the second image data record displays the coronary arteries.

9. The method as claimed in claim 1, wherein the parameter for evaluating the functionality of the organ to be examined is a measure of contrast agent enhancement or washout.

10. The method as claimed in claim 1, wherein the parameter for evaluating the functionality of the organ to be examined is a measure of a perfusion value.

11. The method as claimed in claim 1, wherein the parameter for evaluating the functionality of the organ to be examined is a measure of a contractility value.

12. The method as claimed in claim 1, wherein the parameter for evaluating the function of the organ to be examined is a measure of a thickness of a part of the organ.

13. The method as claimed in claim 1, wherein the parameter for evaluating the function of the organ to be examined is a measure of a motility value.

14. A non-transitory computer readable medium including program segments for, when executed on a computer device, causing the computer device to implement the method of claim 1.

15. A method for automatically selecting a display mode for an image data record of an organ to be examined, comprising:
    displaying a first image data record of the organ to be examined;
    determining values of a parameter in the first image data record of the organ to be examined, the parameter allowing an evaluation of a functionality of the organ to be examined;
    localizing a deviation of the determined values of the parameter from a tolerance range; and
    automatically selecting a display mode of a second image data record based on the result of the localization of the deviation, the second image data record being a 3D image data record.

16. The method of claim 15, further comprising:
    displaying the second image data record in the automatically selected display mode.

17. A non-transitory computer readable medium including program segments for, when executed on a computer device, causing the computer device to implement the method of claim 15.

* * * * *